(12) United States Patent
Shorey et al.

(10) Patent No.: US 6,975,591 B1
(45) Date of Patent: Dec. 13, 2005

(54) METHODOLOGY FOR IMPROVING TCP THROUGHPUT OVER LOSSY COMMUNICATION LINKS

(75) Inventors: Rajeev Shorey, New Dehi (IN); Abhay Chrungoo, Jammu & Kashmir (IN); Vishu Gupta, Delhi (IN); Huzur Saran, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 09/718,679

(22) Filed: Nov. 22, 2000

(51) Int. Cl.$^7$ ............................................. G01R 31/08

(52) U.S. Cl. ................... 370/229; 370/235; 370/289; 709/232; 709/235

(58) Field of Search ................ 370/229–336, 370/389; 709/230–237, 250; 714/748

(56) References Cited

U.S. PATENT DOCUMENTS

| | | | |
|---|---|---|---|
| 6,097,697 A | 8/2000 | Yao et al. | |
| 6,646,987 B1 * | 11/2003 | Qaddoura | 370/231 |
| 6,711,128 B1 * | 3/2004 | Ramakrishnan | 370/230 |
| 6,741,555 B1 * | 5/2004 | Li et al. | 370/229 |
| 6,744,730 B2 * | 6/2004 | Le et al. | 370/229 |
| 6,754,200 B1 * | 6/2004 | Nishimura et al. | 370/349 |
| 6,757,248 B1 * | 6/2004 | Li et al. | 370/235 |
| 6,765,889 B1 * | 7/2004 | Ludwig | 370/331 |
| 2002/0080806 A1 * | 6/2002 | Haggard Ljungqvist | 370/401 |
| 2002/0097722 A1 * | 7/2002 | Liao et al. | 370/392 |
| 2002/0150048 A1 * | 10/2002 | Ha et al. | 370/231 |
| 2002/0154602 A1 * | 10/2002 | Garcia-Luna-Aceves et al. | 370/230 |
| 2003/0103452 A1 * | 6/2003 | Le et al. | 370/229 |

OTHER PUBLICATIONS

Bansal, Deepak, et al, "An Extension of the TCP Flow Control Algorithm for Wireless Networks", Feb 1999, IEEE International Conference on Personal Wirelesss Communication, pp. 207-210.*
"Selective Slow Start: A Simple Algorithm for Improving TCP Performance in Wireless ATM Enviroment", Upkar Varshney, IEEE, US, Nov. 1997, pp. 465-469.
"Differentiating Congestion vs. Random Loss: A Method for Improving TCP Performance over Wireless Links", Christins Parsa and J.J. Garcia-Luna-Aceves, IEEE Wireless Communications and Networking Conference, Sep. 2000, pp. 90-93.

(Continued)

Primary Examiner—Seema S. Rao
Assistant Examiner—Robert C. Scheibel, Jr.
(74) Attorney, Agent, or Firm—McGinn & Gibb, PLLC; T. Rao Coca, Esq.

(57) ABSTRACT

A method for improving TCP throughput over lossy communication links without affecting performance over non-lossy links comprises determining lookahead-loss which is the number of lost packets in a given loss-window; using the loss-window and lookahead-loss to detect congestion in the communication links; and controlling transmission under congestion conditions and under normal conditions, wherein the controlling transmission comprises controlling a size of the loss-window by beginning in a slow-start phase; advancing to a congestion avoidance phase when a slow-start threshold is reached; entering a halt growth phase when the first level of packet loss has been recovered; returning to the congestion avoidance phase when a first level of packet recovery occurs; entering a k-recovery phase when a second level of packet loss occurs. The loss window and slow-start threshold are reduced in half and returned to the congestion avoidance phase when the second level of packet loss has been recovered.

12 Claims, 11 Drawing Sheets

OTHER PUBLICATIONS

"TCP Slow Start, Congestion Avoidance, Fast Retransmit, and Fast Recovery Algorithms", W. Stevens, Network Working Group Request For Comments, Jan. 1997, pp. 1-6.

"TCP k-Sack: A Simple Protocol to Improve Performance over Lossy Links", Abhay Chrungoo, Vishu Gupta, Huzur Saran and Rajeev Shorey, IEEE Global Telecommunications Conference, Nov. 2001, pp. 1713-1717.

European Search Report dated Dec. 23, 2003.

Upkar Varshney, "Selective Slow Start: A Simple Algorithm for Improving TCP Performance in Wireless ATM Environment", IEEE, 1997, pp. 465-469.

Parsa, et al., "Differentiating Congestion vs. Random Loss: A Method for Improving TCP Performance Over Wireless Links", IEEE, 2000, pp. 90-93.

W. Stevens, "TCP Slow Start, Congestion Avoidance, Fast Retransmit, and Fast Recovery Algorithms", Network Working Group, Jan. 1997, pp. 1-6.

Handley, et al., "TCP Congestion Window Validation", Network Working Group, Jun. 2000, 3 pages.

B. Hari, et al., "A Comparison of Mechanisms for Improving TCP Performance Over Wireless Links", Advanced Computer Networks, Spring 2000, 17 pages.

* cited by examiner

METHODOLOGY FOR IMPROVING TCP THROUGHPUT OVER LOSSY COMMUNICATION LINKS

FILED OF THE INVENTION

This invention relates to a methodology for improving TCP throughput over lossy communication links without affecting performance over non-lossy links.

BACKGROUND OF THE INVENTION

Transmission Control Protocol (TCP) [1,4,10], the transport layer protocol widely used in the internet has gradually evolved over the years with newer mechanisms that have helped improve its performance. TCP has been designed as a stream based reliable transfer protocol that can work on top of an underlying network protocol. The built-in end-to-end congestion control and reliable data transfer mechanisms minimize the complexity within the network and more significantly are a critical factor in the robustness of the internet.

Throughout the evolution of TCP, a loss in the network has always been an indication of congestion. This is not the case in many situations, especially when the connection spans lossy links. Due to this, TCP performance is good over wire-line internet links but degrades over lossy links [5,7], such as wireless and satellite channels. Losses due to link characteristics cause TCP to reduce its sending rate thus resulting in bandwidth under-utilization. Wireless links for example, are often characterized by high bit error rates due to channel fading, noise, interference, and intermittent connectivity due to hand-offs. TCP performance in such networks suffers from throughput degradation and very high interactive delays, because the sender misinterprets random packet losses as congestion.

Various mechanisms have been put forward to alleviate the affects of non congestive losses on TCP performance over lossy links. These mechanisms adopt a variety of schemes such as Forward Error Correction, split TCP connections, local retransmissions, link aware protocols, Explicit Loss Notification (ELN). A brief description of some mechanisms is provided.

(1) Split connection protocol: [6] This approach splits the TCP connection between the sender and the receiver into two separate connections, one between the sender and the base station and the other between the same base and the receiver. A base station is a router sitting at the boundary of a lossy network. A specialized protocol fine tuned to the link characteristics is used over the lossy hops to reduce the problems faced by standard TCP over lossy links. The major drawback of the system though, is that it violates end-to-end semantics. Acknowledgements for packets may reach the sender before the data actually reaches the receiver. This also makes the protocol vulnerable to base station crashes.

(2) Snoop Protocol: [8] Snoop protocol is basically a link aware protocol. The mechanism uses an agent sitting on the base station that monitors TCP packets in both directions and caches them. It retransmits such packets if it detects their loss either through duplicate acknowledgements or a local timeout for the acknowledgement.

(3) Explicit Loss Notification: [12] ELN is a link aware mechanism using which the cause for the loss of a packet can be communicated to the TCP sender. The 'snoop' agent sitting at a 'base' station monitors the traffic and keeps track of holes in the sequence space of every connection as it receives data segments. A hole is a missing interval in the sequence space. It then sets the ELN bit on acknowledgements, especially duplicate acknowledgements, if they correspond to a segment in the list. The source uses the ELN notification in its congestion detection mechanism. All such snoop protocols have the inherent disadvantage of being incompatible with end-to-end flows that employ IP layer security using encryption or other means.

(4) U.S. Pat. No. 5,974,028: The methodology for providing transport protocol within a communication network having a lossy link. The receiver distinguishes between packets received with non-congestion bit errors and packets not received due to congestion. It sends selective acknowledgement to the sender indicating which packets were received with non-congestion bit-errors, while suppressing the duplicate acknowledgements to avoid invocation of congestion control mechanisms.

THE OBJECT AND SUMMARY OF THE INVENTION

The object of this invention is to obviate the above disadvantages and provide a system for improving the TCP throughput over lossy communication links without affecting performance over non-lossy links.

To achieve the said objective this invention relates to a system for improving TCP throughput over lossy communication links without affecting performance over non-lossy links comprising:

means for determining lookahead-loss which is the number of lost packets in a given loss-window.

means for using said loss-window and said lookahead loss to detect congestion in said communication links, and means for controlling transmission under congestion conditions as well as under normal conditions.

The said means for determining lookahead-loss is a mechanism for identifying the number of packets transmitted by the sender in said loss-window, for which either of the following conditions is true:

sender has received at least max-dupacks (an appropriately selected number, typically three) duplicate cumulative acknowledgements, sender has neither received acknowledgement nor selective acknowledgement for said packets, while it has received selective acknowledgements for at least max-dupsacks (an appropriately selected number, typically three) packets with higher sequence numbers.

The said means for detecting congestion is a mechanism for identifying when the number of packets lost in a loss-window is greater than an appropriately selected preset number.

The said means for controlling transmission is a TCP k-SACK protocol which is a modification of the fast retransmit algorithm of the basic congestion control algorithm of TCP to include:

entering a 'halt growth phase' whenever lookahead loss is greater than zero and congestion is not detected, entering a 'k-recovery phase' whenever the congestion is detected.

In the said 'halt growth phase', the sender freezes the congestion window and maintains it in that state.

Entry into the said 'k-recovery phase' reduces the congestion window to half its original size, while the slow-start threshold is reduced to half only on the first occasion of entry into the k-recovery phase during a packet loss recovery cycle.

The above system further includes:
"Post Recovery" wherein the sender continues in congestion avoidance or slow-start phase at the end of the fast recovery phase,
more accurate estimation of pipe size using the received selective acknowledgement (SACK) data,
use of said accurate pipe size information for controlling window inflation and deflation thereby allowing quicker retransmission of lost packets and resulting faster recovery.

The present invention further provides a method for improving TCP throughput over lossy communication links without affecting performance over non-lossy links comprising:
determining lookahead-loss which is the number of lost packets in a given loss-window,
using said loss-window and said lookahead loss to detect congestion in said communication links, and
controlling transmission under congestion conditions as well as under normal conditions.

The said determining of lookahead-loss is for identifying the number of packets transmitted by the sender in said loss-window, for which either of the following conditions are true:
sender has received at least max-dupacks (an appropriately selected number, typically three) duplicate cumulative acknowledgements,
sender has neither received acknowledgement nor selective acknowledgemnt for said packets, while it has received selective acknowledgements for at least max-dupsacks (an appropriately selected number, typically three) packets with higher sequence numbers.

The said detecting of congestion is for identifying when the number of packets lost in a loss-window is greater than or equal to an appropriately selected preset number.

The said controlling of transmission is a TCP k-SACK protocol which is a modification of the fast retransmit algorithm of the basic congestion control algorithm of TCP to include:
entering a 'halt growth phase' whenever lookahead loss is greater than zero and congestion is not detected,
entering a 'k-recovery phase' whenever the congestion is detected.

During said 'halt growth phase', the sender freezes the congestion window and maintains it in that state.

During said 'k-recovery phase' reduces the congestion window to half its original size, while the slow-start threshold is reduced to half only on the first occasion of entry into the k-recovery phase during a packet loss recovery cycle.

The above method further includes:
"Post Recovery" wherein the sender continues in congestion avoidance or slow start phase at the end of the fast recovery phase,
more accurate estimation of pipe size using the received selective acknowledgement (SACK) data,
use of said accurate pipe size information for controlling window inflation and deflation thereby allowing early retransmit of lost packets and resulting faster recovery.

The instant invention also provides a computer program product comprising computer readable program code stored on computer readable storage medium embodied therein for improving TCP throughput over lossy communication links without affecting performance over non-lossy links comprising:

computer readable program code means configured for determining lookahead-loss which is the number of lost packets in a given loss-window.
computer readable program code means configured for using said loss-window and said lookahead loss to detect congestion in said communication links, and
computer readable program code means configured for controlling transmission under congestion conditions as well as under normal conditions.

The said computer readable program code means configured for determining lookahead-loss is a mechanism for identifying the number of packets transmitted by the sender in said loss-window, for which either of the following conditions is true:
sender has received at least max-dupacks (an appropriately selected number, typically three) duplicate cumulative acknowledgements,
sender has neither received acknowledgement nor selective acknowledgement for said packets, while it has received selective acknowledgements for at least max-dupsacks (an appropriately selected number, typically three) packets with higher sequence numbers.

The said computer readable program code means configured for detecting congestion is a mechanism for identifying when the number of packets lost in a loss-window is greater than an appropriately selected preset number.

The said computer readable program code means configured for controlling transmission is a TCP k-SACK protocol which is a modification of the fast retransmit algorithm of the basic congestion control algorithm of TCP to include:
entering a 'halt growth phase' whenever lookahead loss is greater than zero and congestion is not detected,
entering a 'k-recovery phase' whenever the congestion is detected.

During said 'halt growth phase', the sender freezes the congestion window and maintains it in that state.

During said 'k-recovery phase' reduces the congestion window to half its original size, while the slow-start threshold is reduced to half only on the first occasion of entry into the k-recovery phase during a packet loss recovery cycle.

The above computer program product further includes:
"Post Recovery" wherein the sender continues in congestion avoidance or slow start phase at the end of the fast recovery phase,
more accurate estimation of pipe size using the received selective acknowledgement (SACK) data,
use of said accurate pipe size information for controlling window inflation and deflation thereby allowing early retransmit of lost packets and resulting faster recovery.

BRIEF DESCRIPTION OF THE DRAWINGS

The invention will now be described with reference to accompanying drawings.

DETAILED DESCRIPTION OF THE DRAWINGS

Figure 1:
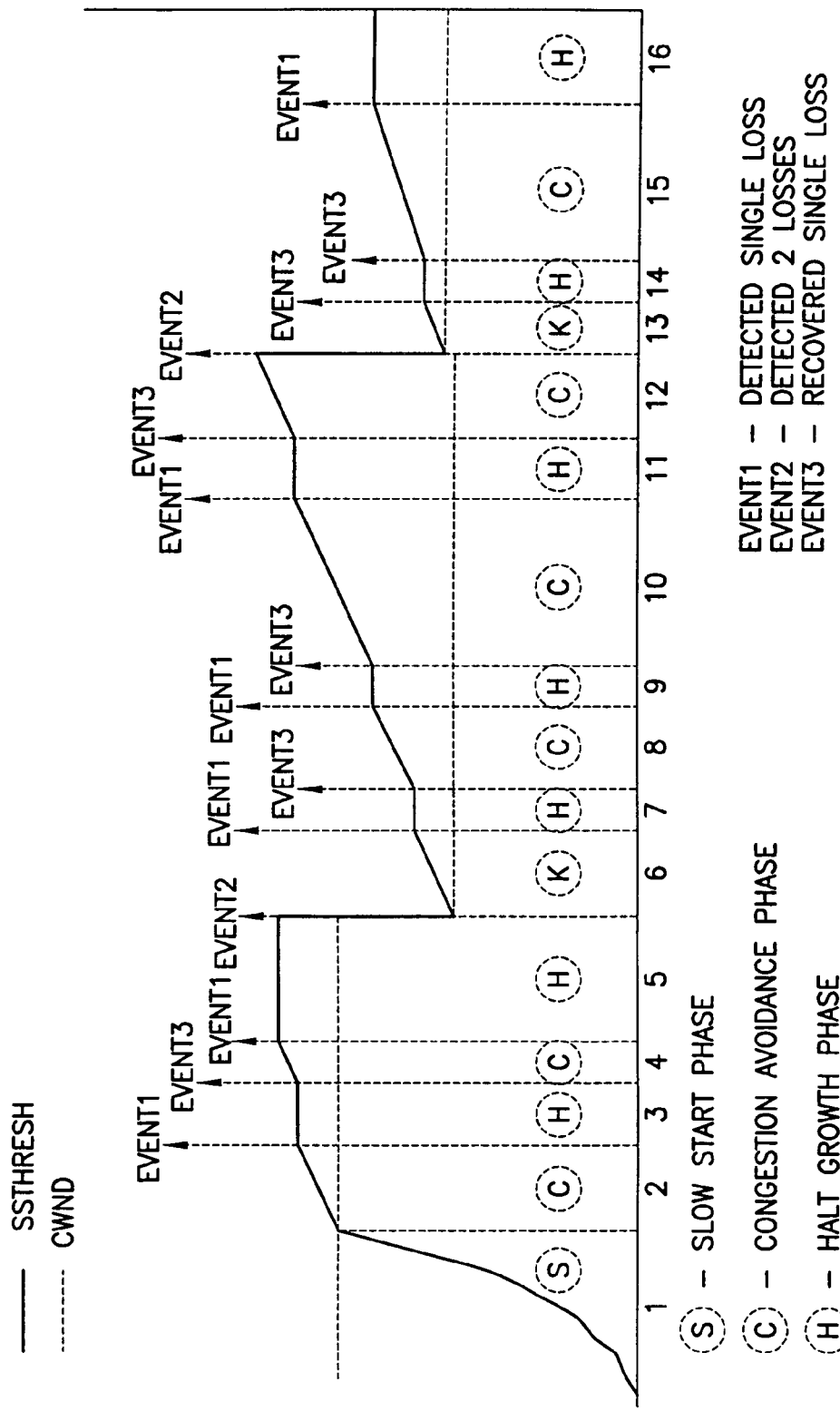
FIG. 1 shows a Sample cwnd evolution for k-SACK.

FIG. 1 shows a sample lwnd evolution for k-SACK for a case with a k-value of '2'. The system window increases rapidly in the slow start phase (1) until it reaches 'ssthresh'. At this stage the system switches to 'congestion avoidance' phase and the window increases slowly (2). When a single packet loss event occurs 'event 1', the system enters 'halt growth' phase (3). In this state the sender continues in fast recovery but does not change the loss-window 'lwnd' and slow start threshold 'ssthresh' values. This situation continues up to 'event 3' i.e. single loss recovered. At this point all the lost packets have been recovered and the system reverts to 'congestion avoidance phase' (4). When another packet loss is detected, the system once again enters the 'halt growth' phase (5) and maintains until 'event 2' i.e. two losses detected. At this point the packet losses equal the 'k' factor and therefore the system goes into the 'k-recovery' phase (6). In this phase the loss-window 'lwnd' and 'ssthresh' are immediately decreased to halt the current 'lwnd' value. The loss-window growth continues from this point and the system remains in 'k-recovery' phase until 'event 1' once again occurs at which point the system enters halt growth phase (7). The system remains in this phase until 'event 3' at which point the packet losses have once again been recovered and the system enters 'congestion avoidance' phase (8). At (9) another 'event 1' occurs and the system reverts to 'halt growth'. This state is maintained until 'event 3' occurs and the system reverts to 'congestion avoidance ' phase (10). Another 'event 1' occurs at (11) and takes the system into 'halt growth' phase which is maintained until (12) when an 'event 3' results in full recovery of loss packets and brings the system back to 'congestion avoidance' phase. At (13) an 'event 2' (loss of two packets) occurs and causes the system to go into 'k-recover' phase. The loss window once again collapses to half the current value and the 'ssthresh' is adjusted to become equal to new 'lwnd'. Another 'event 3' occurs at (14) and brings to system onto 'halt growth' phase until the occurrence of another event 3 at (15) results in full recovery and reverts it to 'congestion avoidance' phase. Finally, an 'event I' at (16) reverts the system to 'halt growth' phase.

The basic congestion control algorithms of TCP [1], slow start, congestion avoidance, fast retransmit are used in the protocol. k-SACK uses a modified fast recovery algorithm.

k-SACK Fast Recovery: The fast recovery phase is separated into two different phases for the purpose of comprehension. On entering the fast recovery phase, if the lookahead-loss is less than k, the sender enters the 'halt growth phase' of fast recovery, else it moves to the 'k-recovery phase' of fast recovery.

halt growth Phase: When in this state, the sender continues in fast recovery, but does not change the lwnd and ssthresh values. It freezes the congestion window and maintains it in that state until the lookahead-loss becomes at least k, whereupon the sender enters the 'k-recovery Phase'. Congestion window growth is unfrozen on moving to 'k-recovery Phase'. After receiving an acknowledgement for up to or beyond 'recover', this phase is exited and the growth of the congestion window unfrozen.

k-recovery Phase: A TCP sender enters this phase while in fast recovery, if the lookahead-loss is at least k. Upon entering this phase for the first time while in the same fast recovery, the ssthresh is set to max(cwnd/2, 2*MSS), and the congestion window is set to ssthresh. When lookahead-loss becomes less than k, the sender changes state to the 'halt growth phase'. The sender may re-enter the k-recovery phase after making a transition to the halt growth phase, while within the same fast recovery. On such a re-entry, cwnd is set to max(cwnd/2, 1MSS) and ssthresh is not changed. The sender continues in this phase until either the lookahead-loss is at least k or the completion of fast recovery.

Figure 2:
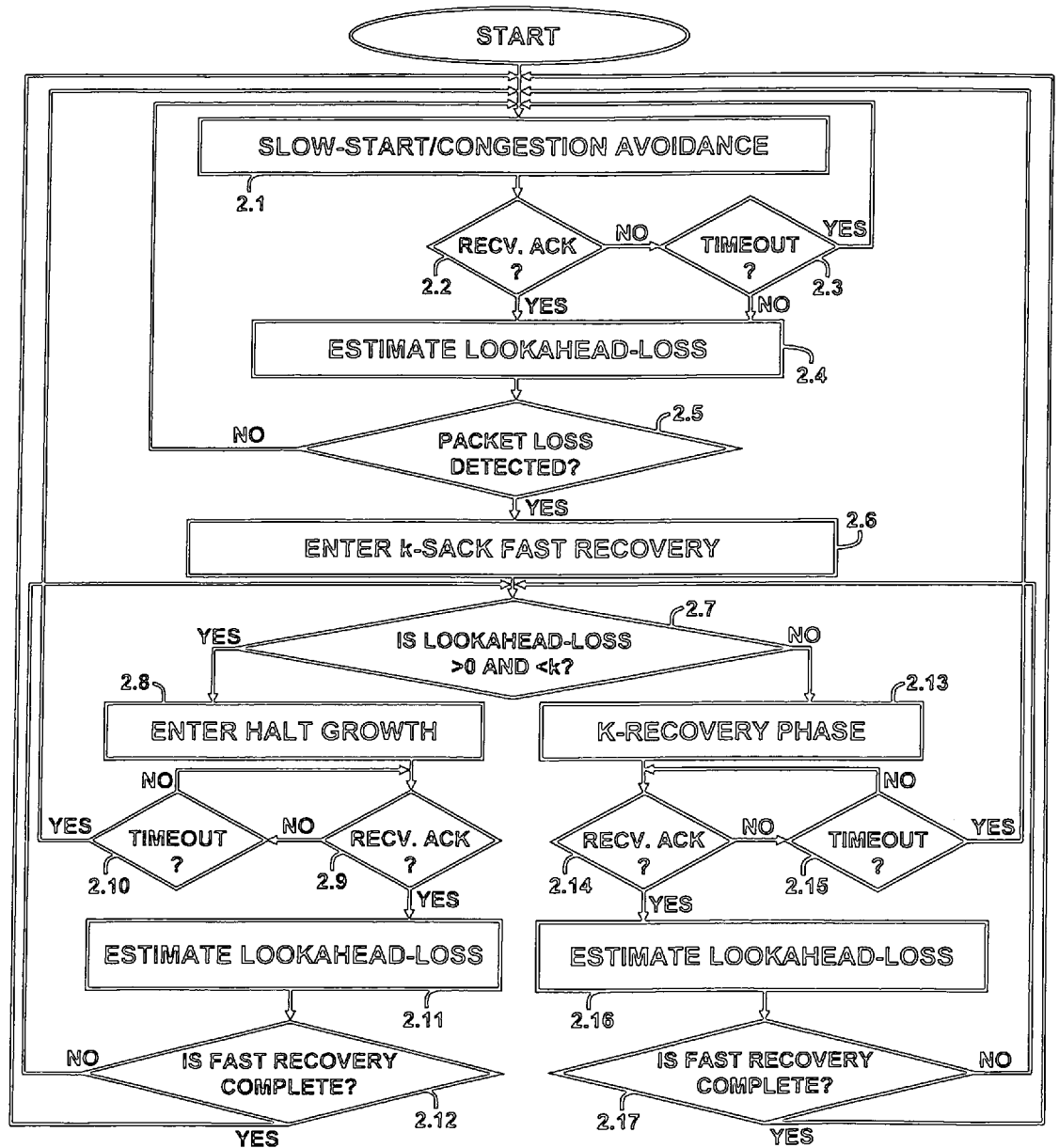
FIG. 2 shows the flow diagram of congestion control algorithm.

FIG. 2 shows the system operation. When no losses are detected, the source is in slow start (SS)/congestion avoidance (CA) phase (2.1). Whenever an acknowledgement packet (2.2) is not received, the source checks for a timeout condition (2.3). If a timeout (2.3 is detected the system reverts to SS/CA phase (2.1). If however, no timeout (2.3) is detected the system calculates the lookahead-loss (2.4) and then checks for packet loss (2.5). Whenever an acknowledgement packet (2.2) is received, the system calculates the lookahead-loss (2.4) and then checks for packet loss (2.5). If no packet loss (2.5) is detected the source remains in the SS/CA phase (2.1). If a packet loss (2.5) is detected the source enters the 'k-sack' fast recovery phase (2.6) and computes the lookahead loss (2.7).

Whenever the lookahead loss (2.7) is found to be greater than '0' but less than ' k' the system moves to the 'halt growth' phase (2.8). Once in the 'halt-growth' phase the source checks for acknowledgement (2.9). If no acknowledgement (2.9) is received, the system checks for a timeout condition (2.10). If a timeout (2.10) is detected, the system reverts to SS/CA phase (2.1). Once an acknowledgement (2.9) is received, the system computes the lookahead loss (2.11). If the lookahead loss is 'O', the fast recovery (2.12) is complete (2.42) and the source reenters the SS/CA phase (2.1). If the fast recovery (2.12) is not complete, the system once again compares the lookahead loss (2.7) with 'k'.

When the lookahead loss (2.7) is found to be greater than 'k', the system enters the 'k-recovery' phase (2.13). Once in 'k-recovery' (2.13) the system checks for acknowledgement (2.14). If no acknowledgement (2.14) is received, the system checks for a timeout condition (2.15). If a timeout (2.15) is detected, the system reverts to SS/CA phase (2.1). If no timeout (2.15) is detected, the system reverts to check for acknowledgement (2.14). Once an acknowledgement (2.14) is received, the system the system computes the lookahead loss (2.16). If the lookahead loss (2.16) is 'O', the fast recovery (2.17) is complete (2.17) and the source reenters the SS/CA phase (2.1). If the fast recovery (2.17) is not complete, the system once again compares the lookahead loss (2.7) with 'k' (2.7).

Figure 3:
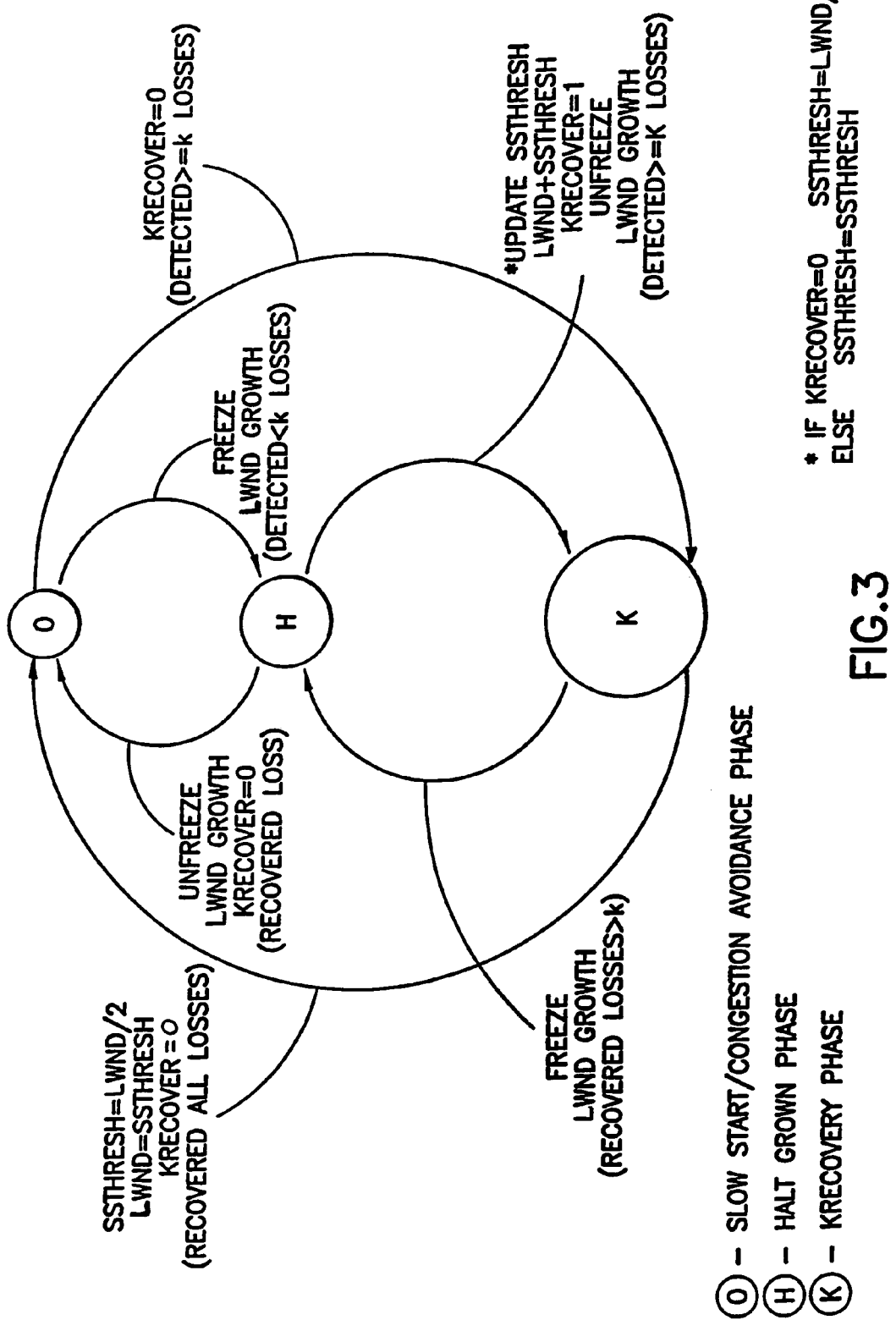
FIG. 3 shows k-SACK fast recovery cwnd and ssthresh dynamics.

In FIG. 3, the system comprises three states:

The "slowstart/congestion avoidance state (0)", the 'Halt Growth State (H)" and the "k-recovery state (K)".

The system initially starts in the '(O)' state and continues in that state until the occurrence of a packet loss. If the number of lost packets is <'k', the system transitions to the 'H' state and while doing so freezes the loss window 'lwnd'. If on the other hand, the number of lost packets is >'k' the system transistions to the 'K' state and while doing so sets the loss window 'lwnd' to 'lwnd/2' and the slow start threshold 'ssthresh' t the same values.

Once in the 'H' state the system remains in that state until either all the lost packets have been recovered at which point the system reverts to the 'O' state, or the number of lost packets increase to ≧'k' at which point the system transitions to the 'K' state. When reverting to the 'O' state the system unfreezes the 'lwnd'. If however, the system transitions to the 'k' state it updates the 'lwnd' to the value 'lwnd/2', while the 'lwnd' growth remains unfrozen. The 'ssthresh' value is set to 'lwnd/2' on the first transition to the 'K' state while it is unchanged in subsequent transitions within a cycle of recovery from packet loss.

Once in the 'K' state the system remains in that state until packet loss >'k', the system transition to the 'O' state and while doing so $k_{recover}=0$, no loss is detected.

If on other hand, the number of recovered packet losses >k the system transition to the 'H' state and while doing so it freezes the loss window 'lwnd'.

Figure 4:
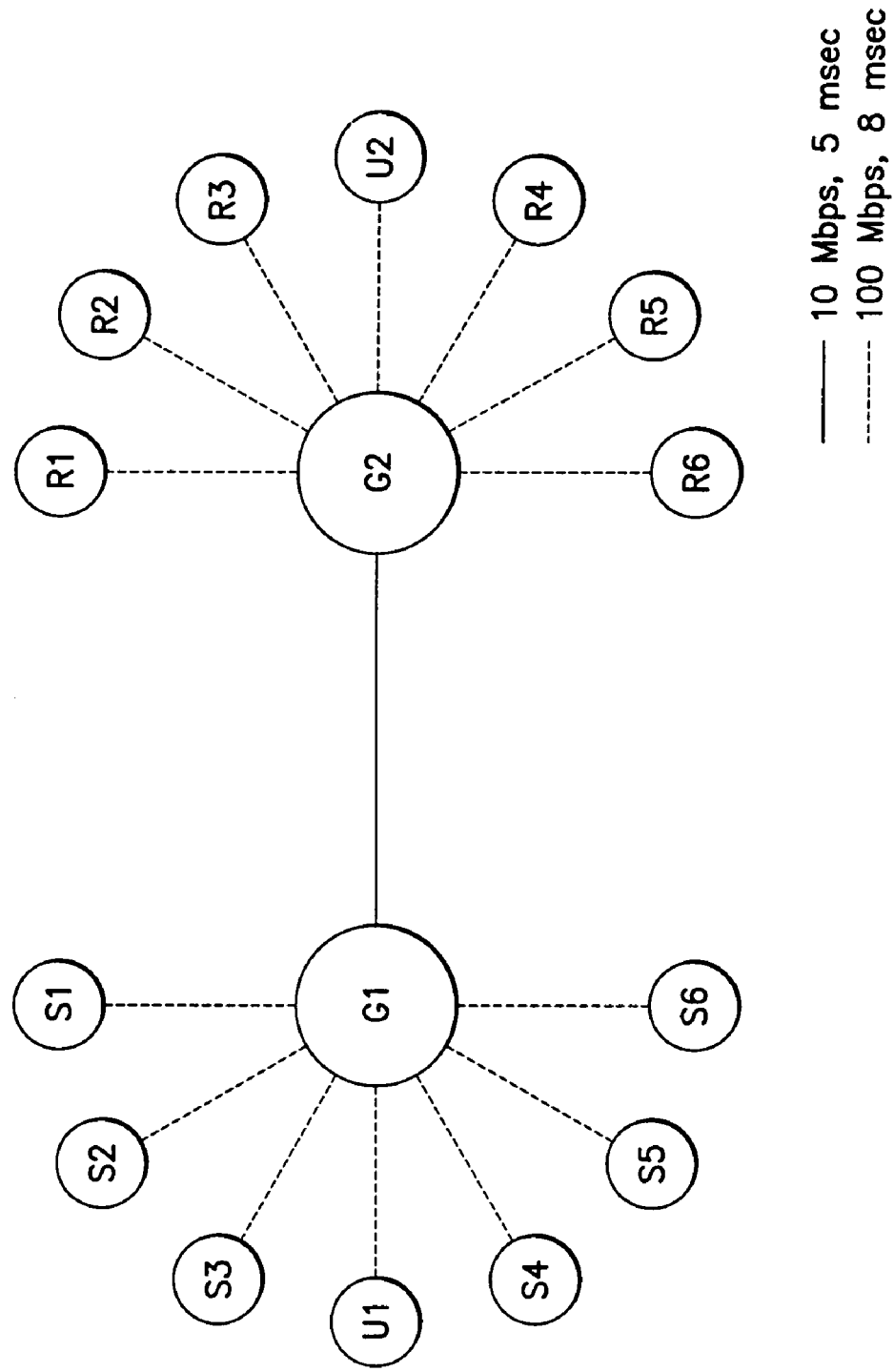
FIG. 4 shows the network topology gateways, G1 & G2 sitting on opposite sides of the bottleneck link with a bandwidth of 10 Mbps and 5 ms delay.
Figure 5A:
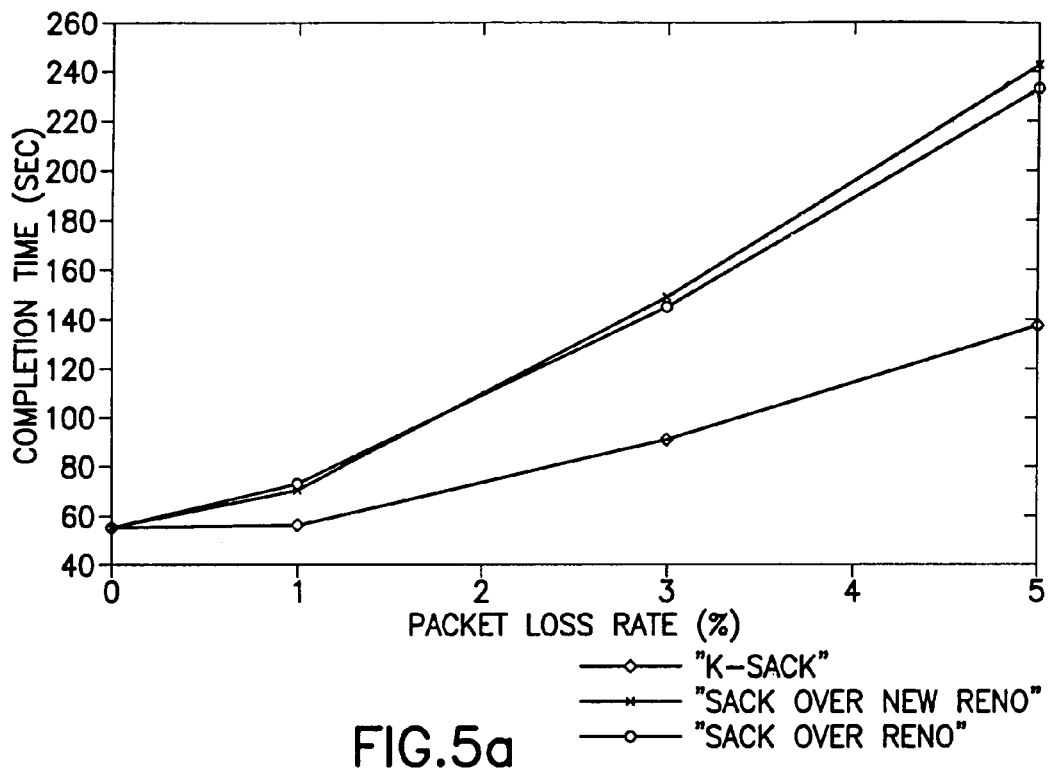
FIG. 5a shows the completion time for 100 kb transfer on Drop Tail gateway.
Figure 5B:
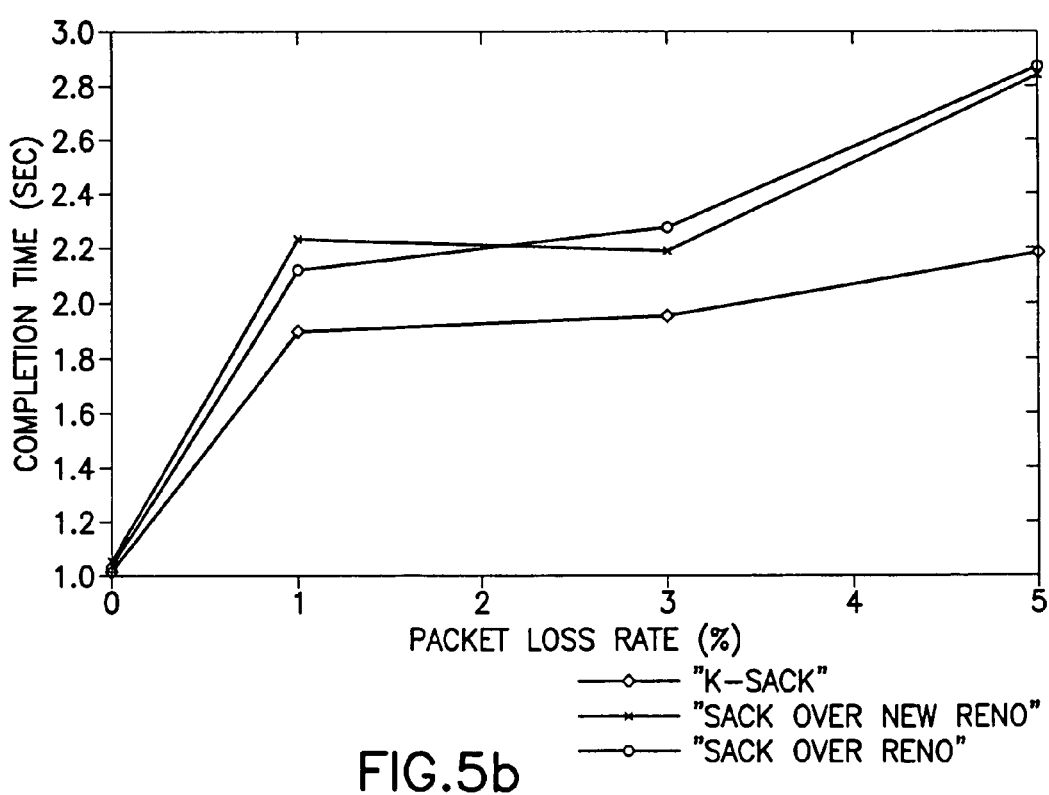
FIG. 5b shows the completion for 100 kb transfer on RED gateway.
Figure 6A:
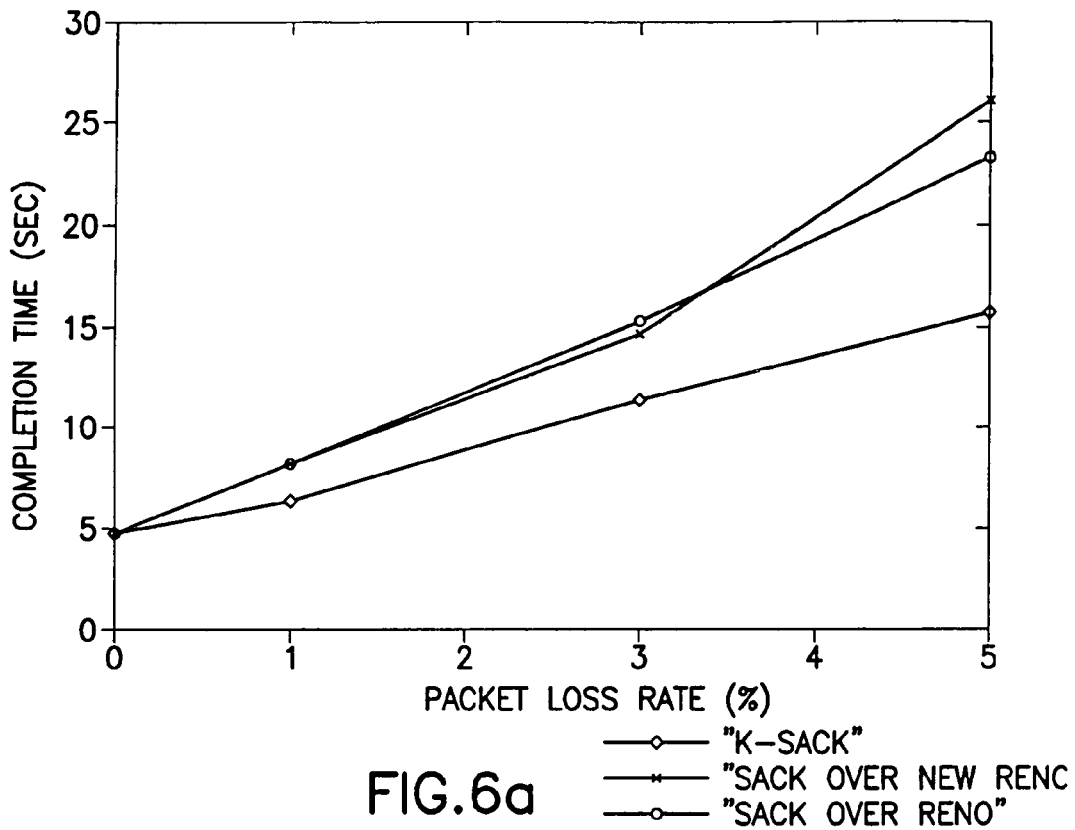
FIG. 6a shows the completion time for 1 Mb transfer on Drop Tail gateway.
Figure 6B:
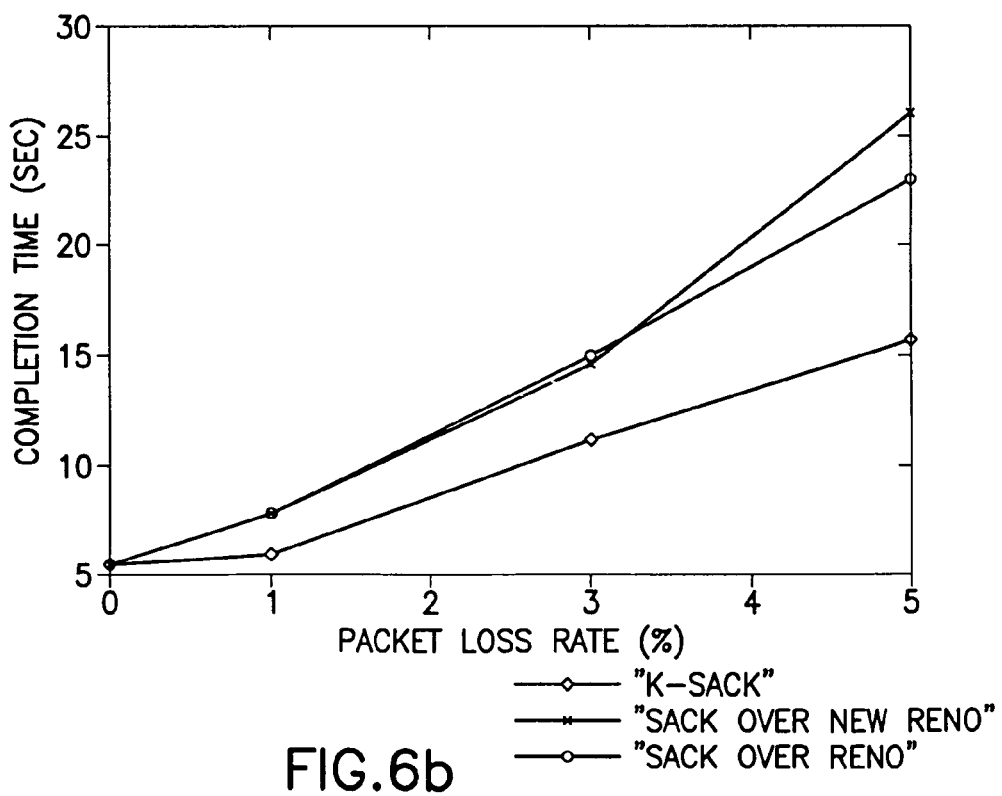
FIG. 6b shows the completion time for 1 Mb transfer on RED gateway.
Figure 7A:
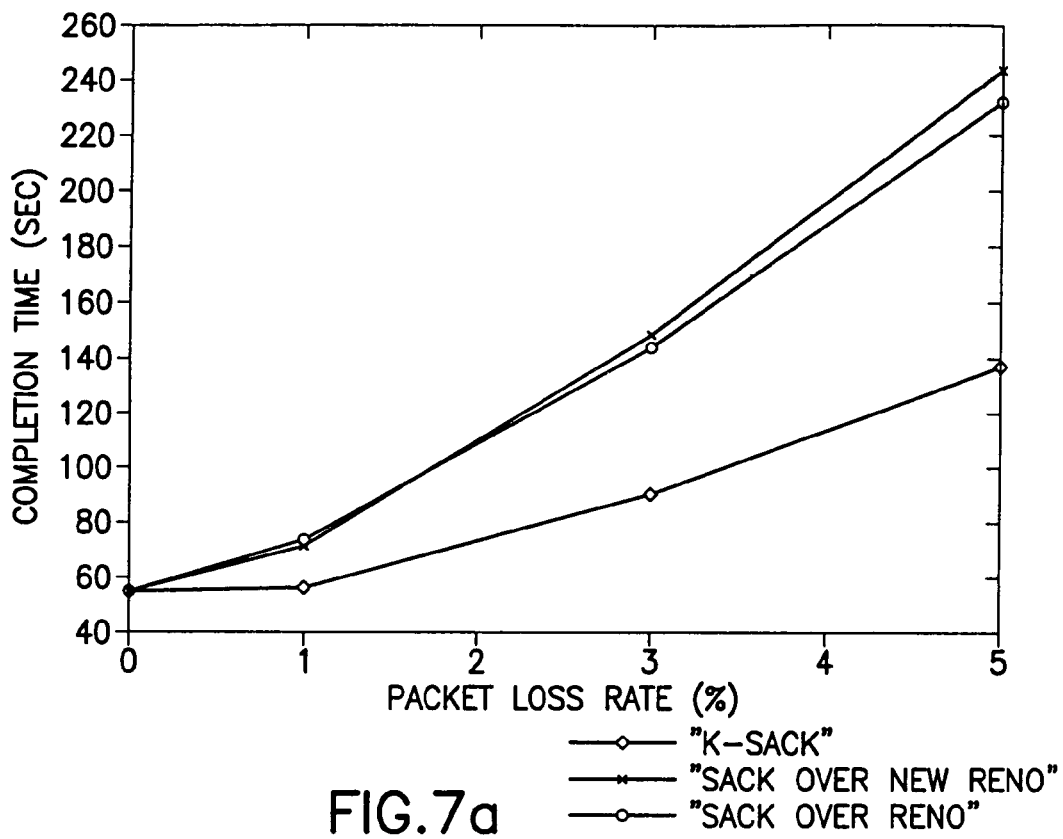
FIG. 7a shows the completion time for 10 Mb transfer on Drop Tail gateway.
Figure 7B:
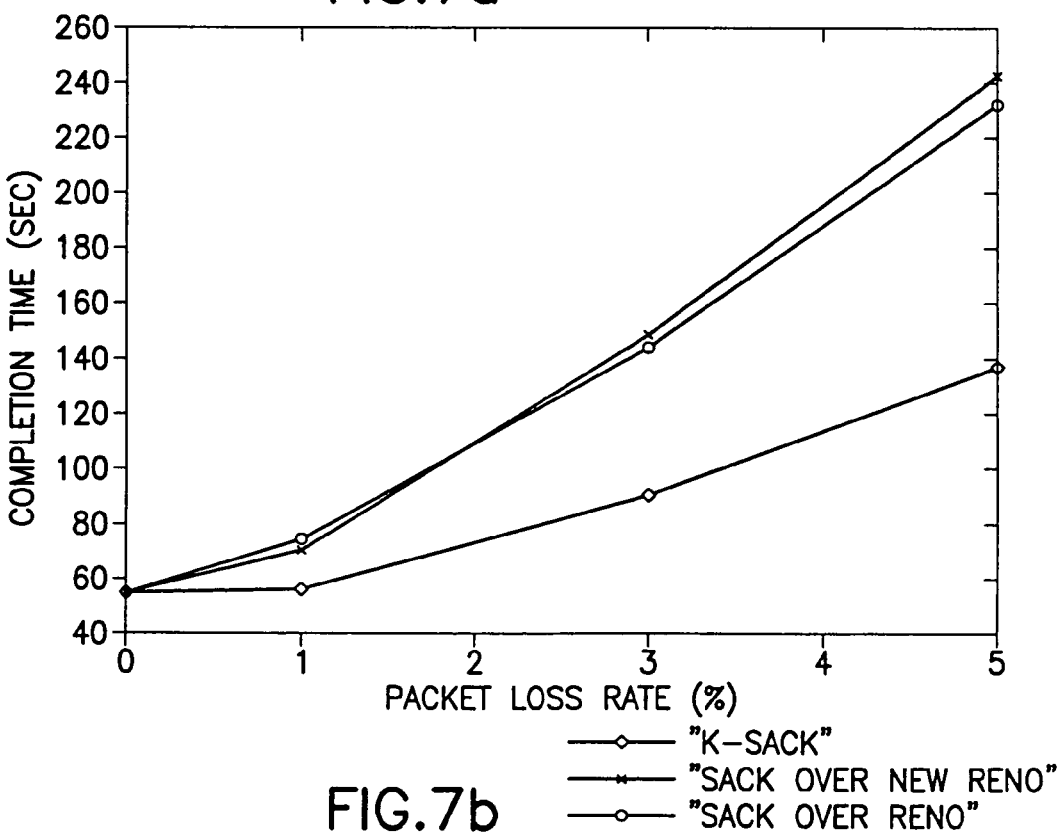
FIG. 7b sows the completion time for 10 Mb transfer on RED gateway.
Figure 8:
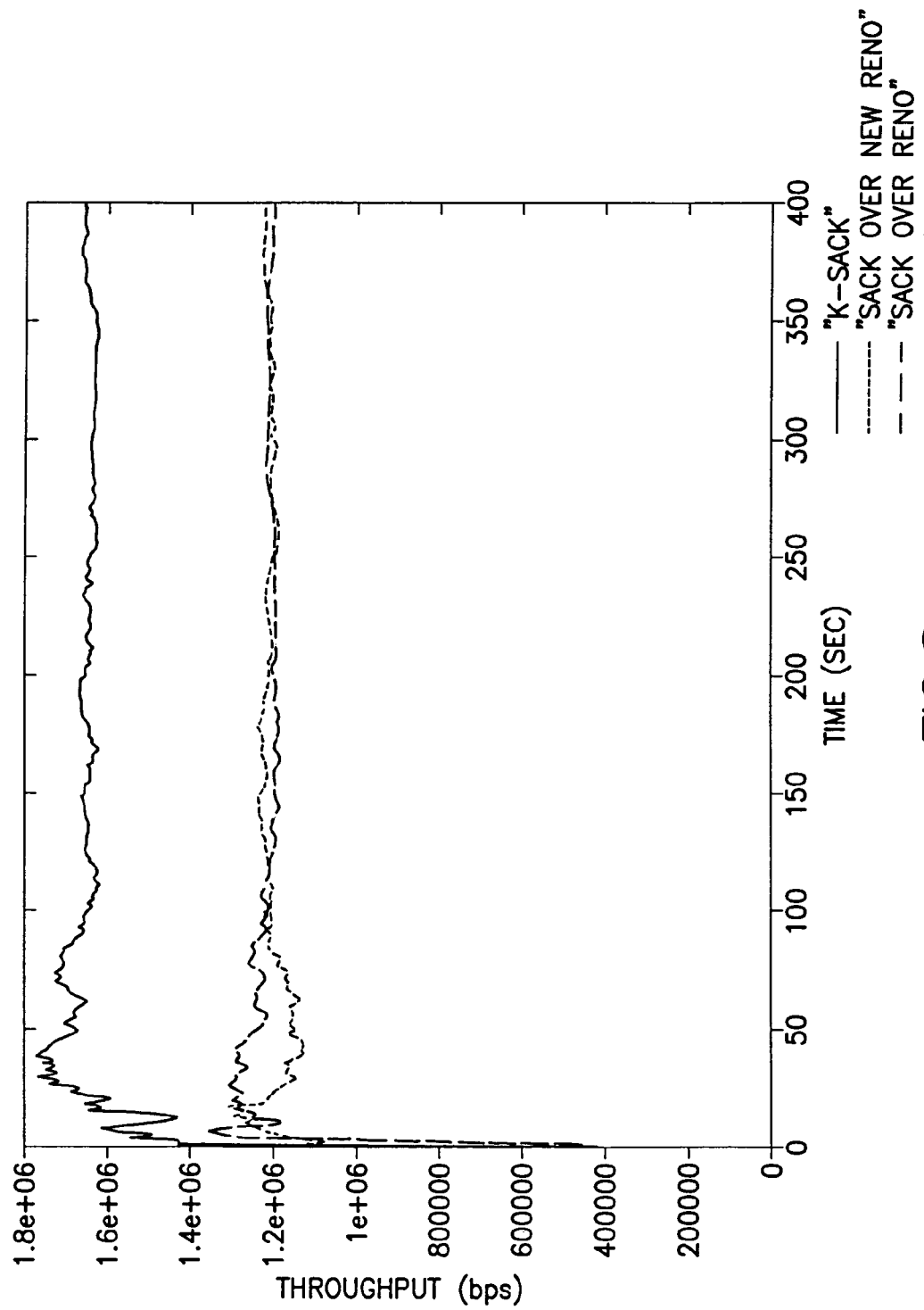
FIG. 8 shows throughput performance across non lossy link.
Figure 9:
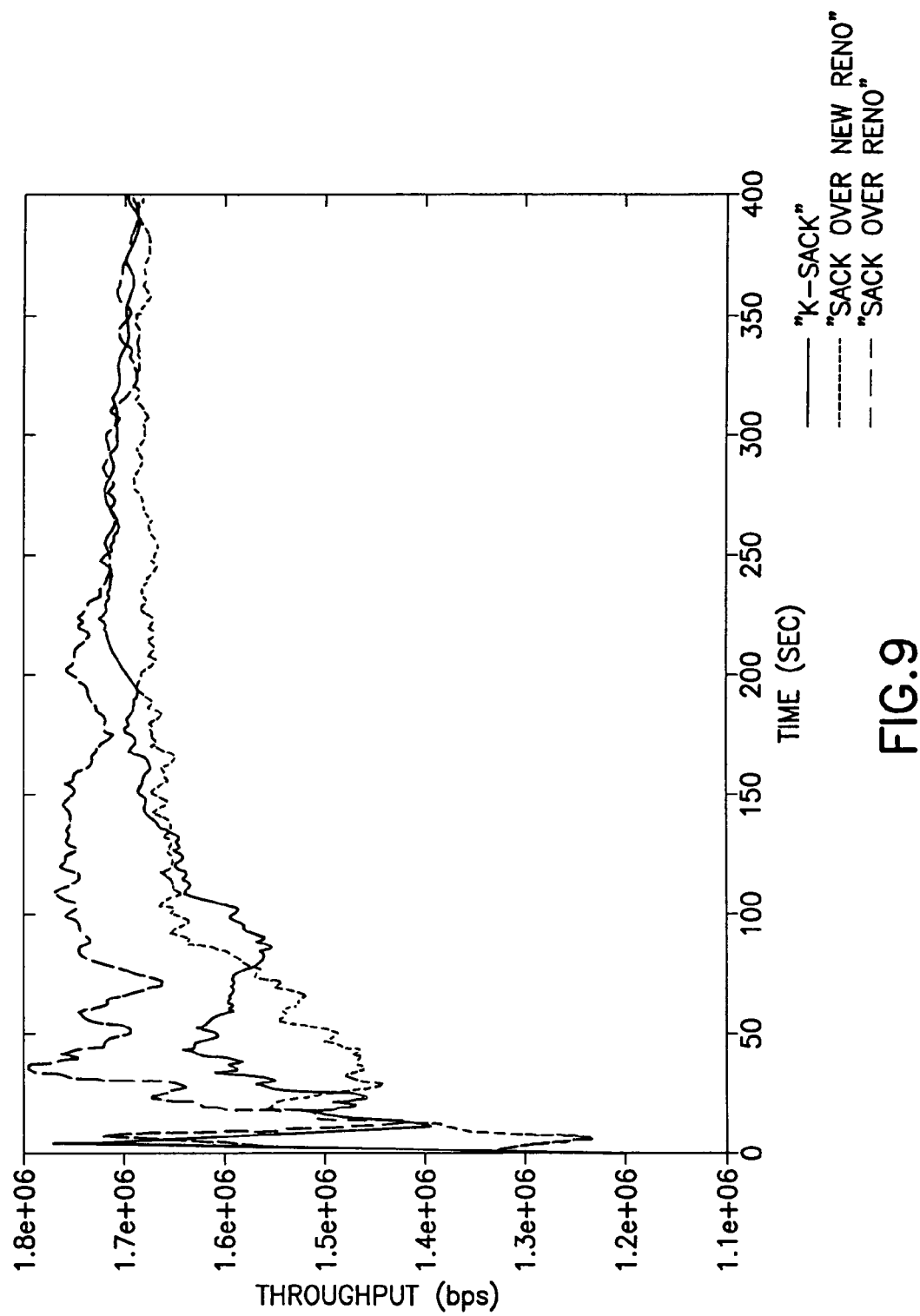
FIG. 9 shows throughput performance across lossy link (1% packet loss rate).
Figure 10:
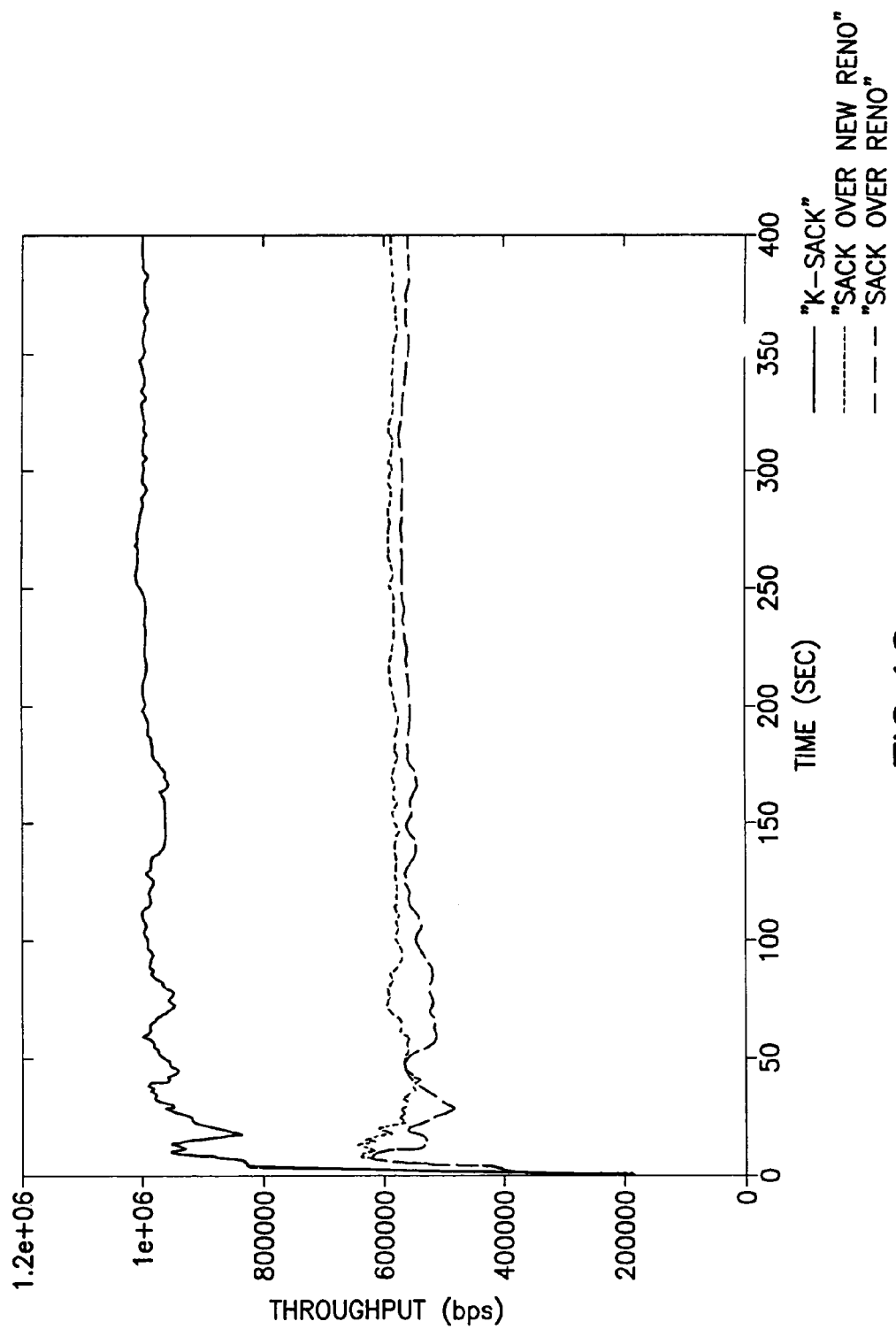
FIG. 10 shows throughput performance across lossy link (3% packet loss rate).
Figure 11:
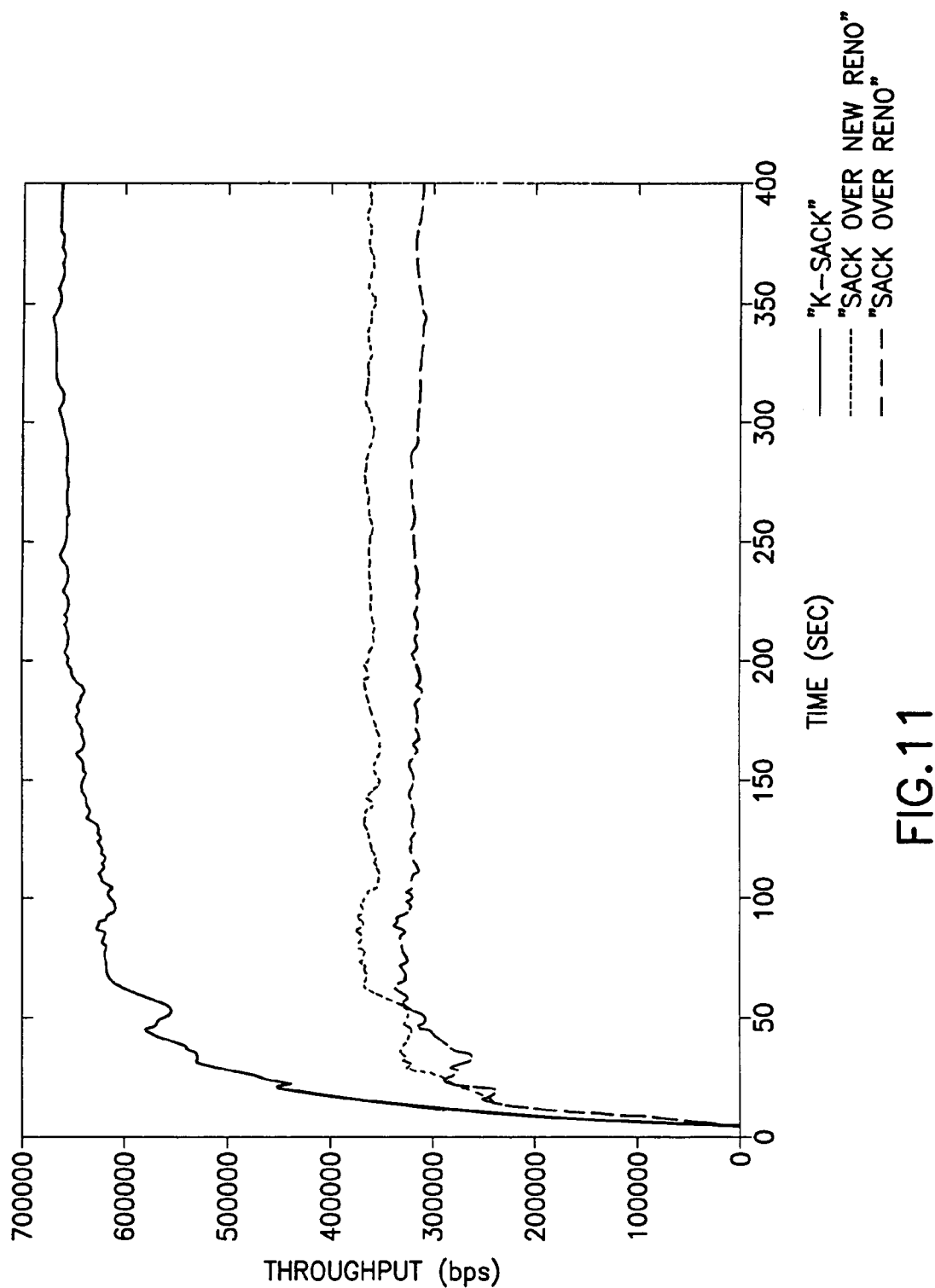
FIG. 11 shows throughput performance across lossy link (5% packet loss rate).

FIG. 4 shows the network topology gateways, G1 & G2 sitting on opposite sides of the bottleneck link with a bandwidth of 10 Mbps and 5 ms delay. The other links are very high capacity links. S1 through S6 are TCP sources and R1 through R6 are the corresponding sinks. To simulate the affect of non-TCP traffic in the internet, the nodes U1 and U2 are shown as a source and sink, the source sending Pareto-distributed UDP traffic to the sink through the bottleneck link. The bottleneck link is modeled as a lossy link with varying packet loss rates. The default packet size of 576 bytes is used to carry the data.

FIGS. 5a, 5b, 6a, 6b, 7a, 7b shows the simulation results for a fixed file transfers of size 100 kb (short transfer), 1 Mb (medium transfer) and 10 Mb (large transfer) across a bottleneck link.

For these simulations, the bottleneck link also carries 15–20% Pareto distributed UDP traffic. The experiments have been conducted using droptail as well as RED [2] gateways at the boundaries of the bottleneck link. Traffic flows in one direction only and hence acknowledgements are never dropped due to congestion on the reverse path. The time taken is averaged over six simultaneous connections and also over multiple simulation runs. Other than due to random losses, the simulation behavior as been forced to change over multiple runs by varying the starting times of the TCP connections.

The completion times for different file sizes clearly show the superior performance of K-SACK over TCP SACK. For non-lossy links, the performance of the different variants are almost similar. However for close to 5% packet loss rates, the completion times are almost half as compared to those observed for TCP SACK. The increase in performance is observed across both droptail as well as RED gateways.

FIGS. 8, 9, 10 & 11 show the throughput performance across non-lossy link. Figures show the throughput of each variant for a very long (persistent source) data transfer. In this case, we have used six simultaneous connections all of the same variant at a time. The throughput values averaged over multiple runs are representative of the link utilization by the TCP senders. The throughput plot of a random TCP connection is plotted for different error rates. As can be seen in the graphs, the throughput of K-SACK is considerably higher than that for TCP SACK even for small error rate and the difference in their respective throughputs increases significantly as the random error rate increases, since TCP KSACK maintains reasonable performance when random losses occur while TCP SACK's performance degrades drastically.

Terminology:
(1) cwnd: The congestion window of a TCP sender.
(2) slow start: The initial phase that a TCP sender starts transmission. cwnd is incremented by one for each acknowledgement received in this phase.
(3) ssthresh: The slow start threshold of a TCP sender.
(4) congestion avoidance: The phase a TCP sender enters when the cwnd becomes greater than ssthresh. The cwnd is incremented by one for every successful transmission of cwnd number of packets.
(5) MSS: The maximum segment size.
(6) max-dupacks: The number of duplicate acknowledgements that the TCP sender must receive for a packet to conclude that it is lost.
(7) fast recovery: The Newreno mechanism to recover from a packet loss.
(8) pipe: The measure of the number of outstanding packets that a TCP sender has in the link.
(9) ns-2: The network simulator version-2.
(10) Lookahead-loss: Lookahead-loss is defined to be equal to the number of packets transmitted by the sender in the given loss-window, such that for all such packets, either of the two holds:
Sender has received at least max-dupacks (typically three) duplicate cumulative acknowledgements for the packet.
The sender has received selective acknowledgements for at least max-dupsacks (typically three) packets with higher sequence numbers.
11. Max-dupsacks: the maximum number of selective acknowledgement received for packets with higher sequence numbers for it to contribute to the look-ahead loss.
12. lwnd: loss-window: the number of transmitted packets used for computing the look-ahead loss.

REFERENCES

[1] W. Richard Stevens TCP/IP Illustrated, Volume 1: The Protocols. Addison Wesley, 1994.

[2] Sally Floyd and Van Jacobson. "Random Early Detection Gateways for Congestion Avoidance,". IEEE/ACM Transactions on Networking, 1(4), pp. 397–413, January 1998.

[3] M. Mathis, J. Mahdavi S. Floyd and A. Romanow. "TCP Selective Acknowledgement Options," 1996. RFC-2018.

[4] V. Jacobson. "Congestion Avoidance and Control,". ACM SIGCOMM 1988. pp 314–329, August 1988.

[5] K. Fall and S. Floyd. "Comparison of Tahoe, Reno and Sack TCP". March 1996.

[6] A. Bakre and B. R. Badrinath. "I-TCP: Indirect TCP for Mobile Hosts,". Proc. 15th International Conference on Distributed Computing Systems, May 1995.

[7] Anurag Kumar. "Comparative Performance Analysis of Versions of TCP in a Local Network with Lossy Link,". IEEE/ACM Transactions on Networking, Dec. 1996.

[8] H. Balkrishnan, V. N. Padmanabhan, S. Seshan, M. Stemm, E. Amir and R. H. Katz, "TCP Improvements for Heterogeneous Networks: The Daedalus Approach". Proc. 35th Annual Allerton Conference on Communication, Control and Computing, Urbana, Ill. October 1997.

[9] E. Ayonglu S. Paul, T. F. LaPorta, K. K. Sabnani and R. D. Gitlin. "AIRMAL: A Link-Layer Protocol for Wireless Networks,". ACM ACM/Baltzer Wireless Networks Journal, 1: pp 47–60, February 1995.

[10] J. B. Postel. "Transmission Control Protocol,". RFC, Information Sciences Institute, Marina Del Rey, Calif., Sept 1981. RFC-793.

[11] S. Floyd and T. R. Henderson. "The Newreno modification to TCP's Fast Recovery Algorithm,". RFC 2582, April 1999.

[12] H. Balakrishnan and R. H. Katz. "Explicit Loss Notification and Wireless Web Performance,". Proc. IEEE Globecom 1998, Internet mini-conference, Sydney, Australia.

We claim:

1. A method for improving TCP throughput over lossy communication links without affecting performance over non-lossy links comprising:
   determining lookahead-loss which is the number of lost packets in a given loss-window;
   using said loss-window and said lookahead loss to detect congestion in said communication links; and
   controlling transmission under congestion conditions as well as under normal conditions,
   wherein said controlling transmission comprises controlling a size of said loss-window by:
      beginning in a slow-start phase;
      advancing to a congestion avoidance phase when a slow-start threshold is reached;
      entering a halt growth phase when a first level of packet loss occurs;
      returning to said congestion avoidance phase when the first level of packet loss has been recovered;
      entering a k-recovery phase when a second level of packet loss occurs,
      wherein said loss window and said slow-start threshold are reduced in half and returning to said congestion avoidance phase when the second level of packet loss has been recovered.

2. The method as claimed in claim 1, wherein said determining of lookahead-loss is for identifying the number of packets transmitted by a sender in said loss-window for which at least one of the following conditions is true:
   said sender has received at least max-dupacks duplicate cumulative acknowledgements, and
   said sender has neither received acknowledgement nor selective acknowledgment for said packets, while it has received selective acknowledgements for at least max-dupsacks packets with higher sequence numbers.

3. The method as claimed in claim 1, wherein said detecting of congestion is for identifying when the number of packets lost in said loss-window is greater than an appropriately selected preset number.

4. The method as claimed in claim 1, wherein said controlling transmission is a TCP k-SACK protocol which is a modification of a fast retransmit algorithm of a basic congestion control algorithm of TCP to include entering a 'halt growth phase' whenever said lookahead loss is greater than zero and congestion is not detected, and entering 'a k-recovery phase' whenever the congestion is detected.

5. The method as claimed in claim 4, wherein during said 'halt growth phase' a sender freezes a congestion window and maintains it in that state.

6. The method as claimed in claim 4, wherein said entry into 'k-recovery phase' reduces a congestion window to half its original size, while a slow-start threshold is reduced to half only on a first occasion of entry into the k-recovery phase during a packet loss recovery cycle.

7. A computer program product comprising computer readable program code stored on computer readable storage medium embodied therein for improving TCP throughput over lossy communication links without affecting performance over non-lossy links comprising:
   a computer readable program code configured for determining lookahead-loss which is the number of lost packets in a given loss-window;
   a computer readable program code configured for using said loss-window and said lookahead loss to detect congestion in said communication links; and
   a computer readable program code configured for controlling transmission under congestion conditions as well as under normal conditions,
   wherein said computer readable program code configured for controlling transmission comprises a computer readable program code configured for controlling a size of said loss-window by:
      beginning in a slow-start phase;
      advancing to a congestion avoidance phase when a slow-start threshold is reached;
      entering a halt growth phase when a first level of packet loss occurs;
      returning to said congestion avoidance phase when the first level of packet loss has been recovered;
      entering a k-recovery phase when a second level of packet loss occurs,
      wherein said loss window and said slow-start threshold are reduced in half and returning to said congestion avoidance phase when the second level of packet loss has been recovered.

8. The computer program product as claimed in claim 7, wherein said computer readable program code configured for determining of lookahead-loss comprises a computer readable program code configured for identifying the number of packets transmitted by a sender in said loss-window for which at least one of the following conditions is true:
   said sender has received at least max-dupacks duplicate cumulative acknowledgements, and
   said sender has neither received acknowledgement nor selective acknowledgment for said packets, while it has received selective acknowledgements for at least max-dupsacks packets with higher sequence numbers.

9. The computer program product as claimed in claim 7, wherein said computer readable program code configured for detecting of congestion comprises a computer readable program code configured for identifying when the number of packets lost in said loss-window is greater than an appropriately selected preset number.

10. The computer program product as claimed in claim 7, wherein said computer readable program code configured for controlling transmission is a TCP k-SACK protocol which is a modification of a fast retransmit algorithm of a basic congestion control algorithm of TCP to include entering a 'halt growth phase' whenever said lookahead loss is greater than zero and congestion is not detected, and entering 'a k-recovery phase' whenever the congestion is detected.

11. The computer program product as claimed in claim 10, wherein during said 'halt growth phase' a sender freezes a congestion window and maintains it in that state.

12. The computer program product as claimed in claim 10, wherein said entry into 'k-recovery phase' reduces a congestion window to half its original size, while a slow-start threshold is reduced to half only on a first occasion of entry into the k-recovery phase during a packet loss recovery cycle.

* * * * *